ated November 11, 1913.
UNITED STATES PATENT OFFICE.

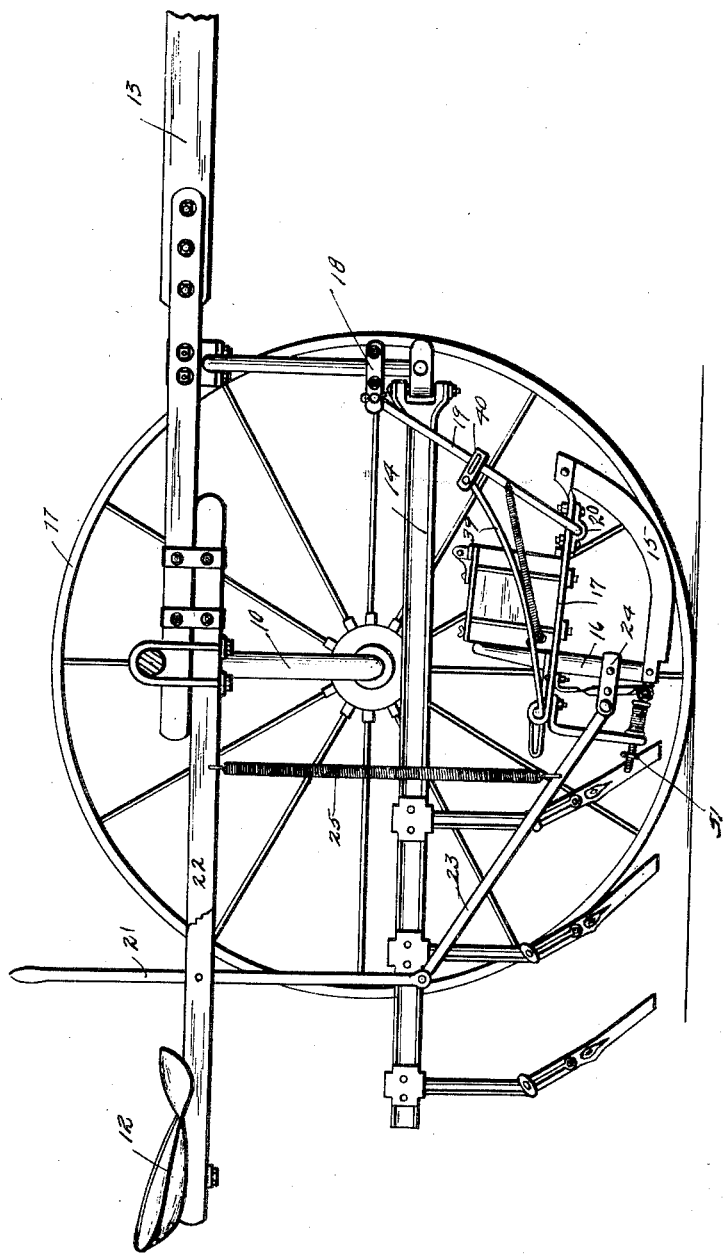

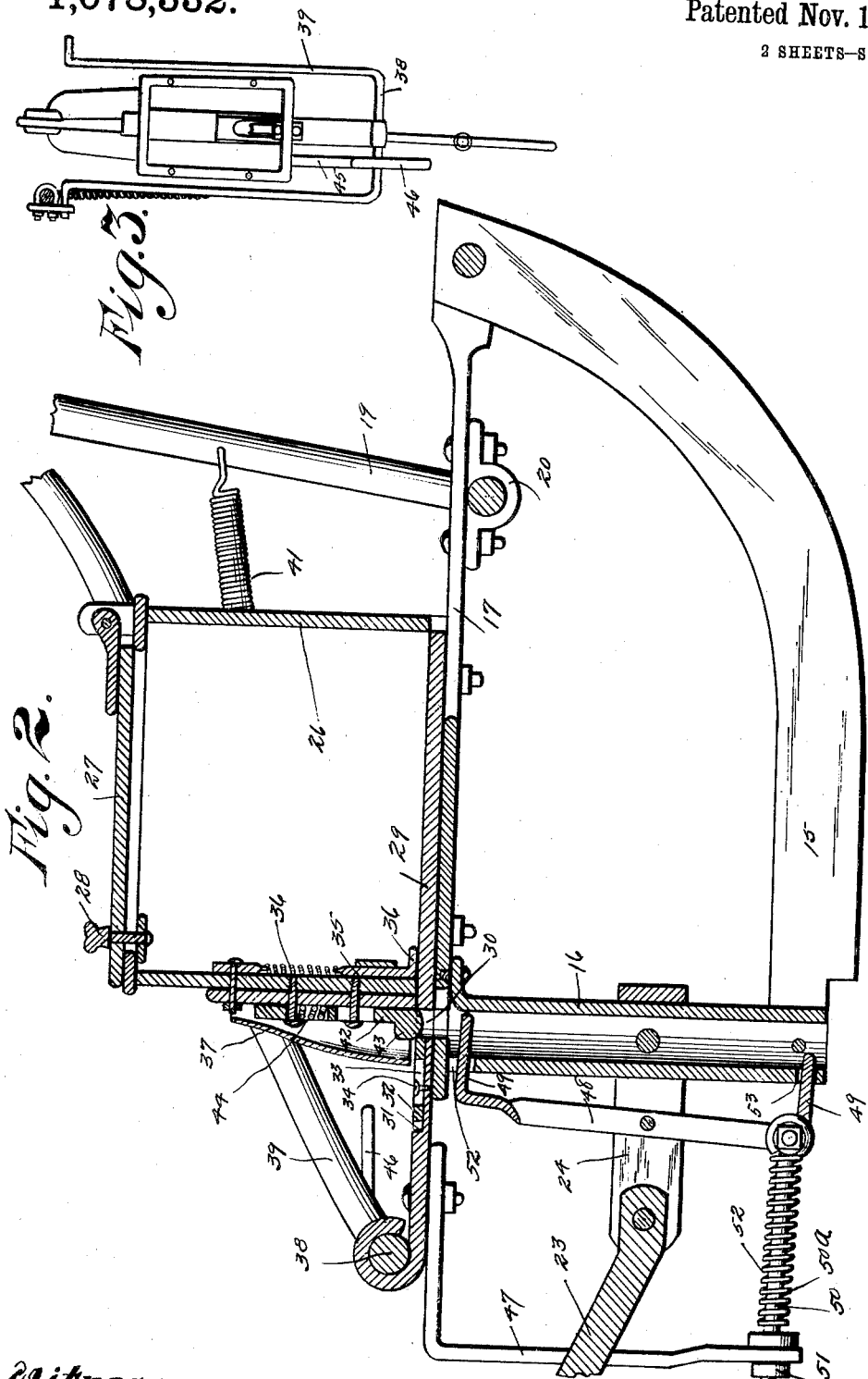

JOE J. CHOLICK, OF LAKEFIELD, MINNESOTA.

CORN-REPLANTING MACHINE.

1,078,332.  Specification of Letters Patent.  Patented Nov. 11, 1913.

Application filed August 2, 1912. Serial No. 712,943.

*To all whom it may concern:*

Be it known that I, JOE J. CHOLICK, a citizen of the United States, residing at Lakefield, in the county of Jackson and State of Minnesota, have invented a new and useful Corn-Replanting Machine, of which the following is a specification.

The object of my invention is to provide a replanting device of simple, durable and inexpensive construction, designed to be mounted on a corn cultivator.

More particularly it is my object to provide a replanter of the kind mentioned, which may be easily attached to or detached from a corn cultivator. The parts are so arranged that it may be operated by the driver from his ordinary position for replanting hills in which the corn has not grown.

Still a further object is to provide such a device having a planter shoe, and having controlling mechanism therefor, so constructed and arranged that the shoe may be carried above the ground except during the operation of replanting and during the operation of replanting may be forced more or less deeply into the ground.

Still a further object is to provide such a device provided with mechanism which can be suitably controlled for depositing the corn at any desired point in the ground.

My invention consists in certain details, in the construction, arrangement and combination of the various parts, whereby the objects contemplated are attained, as hereinafter more fully set forth, pointed out in my claims, and illustrated in the accompanying drawings, in which—

Figure 1 shows a longitudinal, vertical, sectional view of the cultivator equipped with a corn replanting machine embodying my invention. Fig. 2 shows a top or plan view of the replanting device, and Fig. 3 shows a vertical, longitudinal view through my replanting machine.

In the accompanying drawings, I have used the reference numeral 10 to indicate generally the frame of a cultivator mounted on the wheels 11. The frame includes a member 22 on which is a seat 12. The machine is drawn by the tongue 13. Pivoted to the frame of the cultivator are the beams 14.

My improved replanting device and the method of mounting the same on the cultivator will now be described.

My improved replanting device comprises a planter shoe 15, similar in general construction to the ordinary shoe of a corn planter. At the rear end of the shoe 15 there is an upwardly extending hollow planter leg 16.

Pivoted to the bracket 18, is a downwardly, rearwardly extending rod 19 which is pivoted to the member 17, just rearwardly from the forward end of the shoe 15 by means of an adjustable bracket 20. A lever 21 is pivoted between its ends to the bar or frame member 22 which supports the seat. Pivoted to the lower end of the lever 21 is a link 23 which extends downwardly and forwardly and is pivoted at its forward end to a bracket 24 secured to the planter leg 16. Secured to the member 22 is a depending contractible coil spring 25, which at its lower end is secured to the link 23 near the forward end thereof.

It will be seen that my replanter is swingingly mounted on the cultivator frame by the means just described.

Mounted on the frame member 17 of my replanter is a seed box 26 on which is a hinged cover 27 provided with a locking means 28. The seed box 26 is provided with a slidable bottom 29, which is so arranged that when it is at the rearward limit of its movement it closes the bottom of the seed box, as shown in Fig. 2. Rearwardly of its center the bottom 29 is provided with a seed receiving slot 30, which extends entirely through the bottom 29. A slot 31 extends rearwardly from the slot 30 but is not deep enough to extend through the bottom 29.

Slidably mounted in the slot 31 is a bar 32 having a central longitudinal slot 33. By sliding the bar 32 forwardly or rearwardly the size of the seed receiving slot 30 may be varied as desired. By means of the screw 34 extending through the slot 33 and screwed into the bottom 29, I am able to fasten the bar 32 in any position of its movement.

Slidably mounted on the rear wall of the box 26 at the lower end thereof is a bar 35 having at its lower edge the laterally extending flange 36. When the bottom 29 is at the forward position of its movement the slot 30 is within the box 26, in position to receive seed. The member 17 is wide enough to provide a bottom beneath the slot 30 when the member 29 is in its last named position. The bar 35 is yieldingly held in its last named position by means of the coil spring 36. When the bottom 29 is moved rearwardly the flange 36 clears off the surplus seed.

Secured to the outside of the rear end of the box 26 is a casing 37. Pivotally secured to the rear end of the bottom 29 is a transverse rod 38, on each end of which rod is a forwardly extending arm 39. The forward ends of the arms 39 are pivoted to the bracket 40 on the rods 19 as clearly shown in Fig. 1. Secured to one of the arms 39 and to the arm 19 on the same side of the machine, at a point below the bracket 40 is a contractible coil spring 41.

Slidably mounted on the outside of the rear wall of the box 26 is a bar 42, having formed on its lower end the lug 43. For holding the bar 42 at the lower limit of its movement I have provided an expansible coil spring 44. The lower surface of the lug 43 is rounded or beveled, as shown in Fig. 2. When the slidable member 29 is in proper position the lower portion of the lug 43 enters the slot 30 and locks said member 29 against sliding movement. The lower portion of said lug 43 also serves to push the corn downwardly through the opening 30, should the corn become clogged from dampness or any other reason.

Secured to the frame member 17 is a rearwardly extending bar 45, having on its rear end a protruding bent bar forming the guide device 46. The device just described limits the rearward movement of the member 38 which travels between the rod 45 and the portion 46. Secured to the rear end of the member 29 is a downwardly extending bracket 47. Centrally pivoted to the bracket 24 is a substantially vertical bar 48. At both ends of the bar 48 and slidably extending through the lower end of the bar 47 is a rod 50. The rearward end of the rod 50 is screw-threaded over a considerable distance to receive the nut 51. A spring 50$^a$ is of such length as to permit slight play of the rod 50 on the bracket 47.

The bar 48 and the member 49 are so constructed and arranged that when the member 29 is at the rearward position of its movement the upper member 49 enters the planter leg 16 through the slot 52 and closes the upper end of the planter leg, thereby preventing the seed being dropped through said planter leg.

When the member 29 is moved to the forward position of its movement the lower member 49 is moved forwardly through the slot 53 into the lower portion of the leg 16.

After my improved replanting attachment has been properly installed on the cultivator its parts operate as follows: The arrangement of the spring 25 and the parts hereinbefore described are such that the replanting device is normally held in its rearward raised position with the member 49 at the forward position of its movement, as shown in Fig. 1. To operate the replanting device the handle or lever 21 is drawn rearwardly, thereby moving the member 29 rearward carrying with it the seed in the slot 30. When the lever 21 is released, the replanter returns to its normal position, and the seed drops to the top of the lower member 49. When the cultivator is drawn forward and a hill is found in which the seed has failed to grow the lever 21 is drawn rearwardly and the planter shoe is forced into the ground and the lower member 49 is withdrawn from the planter leg. Owing to the play permitted to the bracket 47 with relation to the rod 50 the planter shoe 15 completes a part of its downward and forward movement before the bracket 47 engages the nut 51 and draws the lower member 49 out of the planter leg. By drawing the lever 21 forwardly or rearwardly the depth of the travel of the shoe 15 may be increased or decreased to control the depth at which the seed is planted. After the seed has been planted the lever 21 may be released and all the parts return to their normal position. By means of the nut 51 on the rod 50 the movement of the parts by means of the bracket 47 on said rod and by means of the construction and arrangement of the other parts, the operation of the device is so regulated or timed that when the planter shoe has reached the proper depth the lower member 49 is then moved away from the planter leg and the seed drops.

The advantages of my improved corn replanting device may be largely seen from the foregoing descriptions.

My machine is of simple and comparatively inexpensive construction. It may be quickly and easily attached to a cultivator. Suitable mechanism is provided for varying the number of grains planted in each hill. The parts are so arranged that they may be quickly and easily taken apart and replaced and repaired. The total weight is comparatively small.

My replanting device is easily operated, and on account of the arrangements of the parts, as hereinbefore described, the depth of the planting and the exact location of the hill may be accurately located.

It will be understood that variations may be made in the details of the construction of my device, and it is my intention to cover by this application any variations in construction which may be included within the scope of the following claims.

I claim as my invention:

1. In a device of the class described, a planter shoe, a corn dropper tube at the rear end thereof, a corn box on said shoe, a dropper plate in said box, means for pivotally mounting said shoe at two points on the cultivator frame in such manner that said shoe may be swung downwardly and forwardly from its normal position, means for closing the lower end of said tube, and means whereby the downward and forward movement of said shoe operates said dropper plate and moves said closing means to position for opening said tube.

2. In a device of the class described, a planter shoe, a corn dropper tube at the rear end thereof, a corn box mounted on said shoe above said tube, the dropper plate slidably mounted in said box, rods pivoted to said shoe near the forward end thereof, and designed to be pivotally mounted on the cultivator frame, a bar secured to said tube and extending rearwardly therefrom, a lever pivoted to said bar and designed to be pivoted between its ends on the cultivator frame, means for yieldingly holding said device normally in position with said first named rods inclined from the cultivator frame downwardly and rearwardly, a rod pivoted to one of said first named rods at a point below its upper end and operatively connected with said dropper plate, said parts being so arranged that when the shoe is swung downwardly and forwardly the dropper plate is operated by said last named rod.

3. In a device of the class described, a planter shoe, a corn dropper tube at the rear end thereof, a corn box mounted on said shoe above said tube, a dropper plate slidably mounted in said box, rods pivoted to said shoe near the forward end thereof, and designed to be pivotally mounted on the cultivator frame, a bar secured to said tube, and extending rearwardly therefrom, a lever pivoted to said bar and designed to be pivoted between its ends on the cultivator frame, means for yieldingly holding said device normally in position with said first named rods inclined from the cultivator frame downwardly and rearwardly, a rod pivoted to one of said first named rods at a point below its upper end and operatively connected with said dropper plate, a bar pivotally mounted and having an extension arranged in one position of the movement of said bar to close said tube, an arm mounted on said dropper plate, and operatively connected with said last named bar, said parts being so constructed and arranged that the downward and forward swing of said shoe slides said dropper plate rearwardly and moves said closing device rearwardly when the shoe has reached its lowermost position.

JOE J. CHOLICK.

Witnesses:
JOHN J. JANASKO,
JOHN PAVELKO.